Patented Nov. 19, 1946

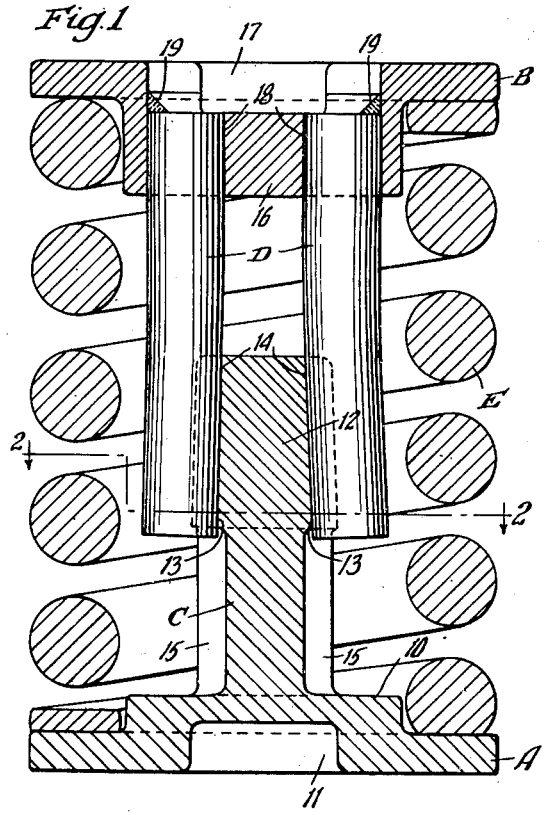
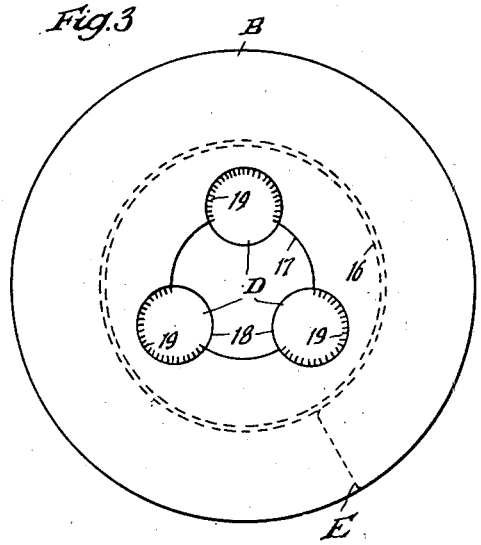
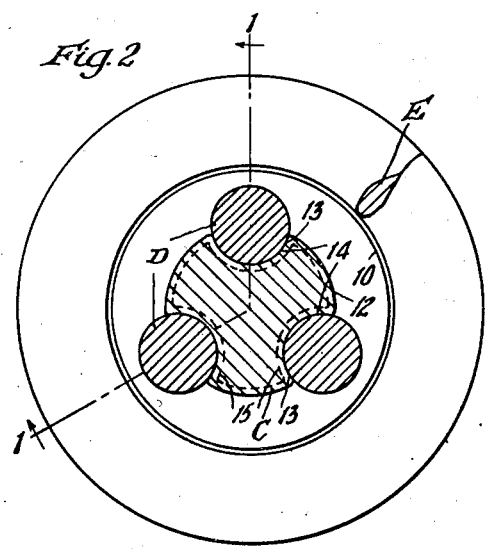
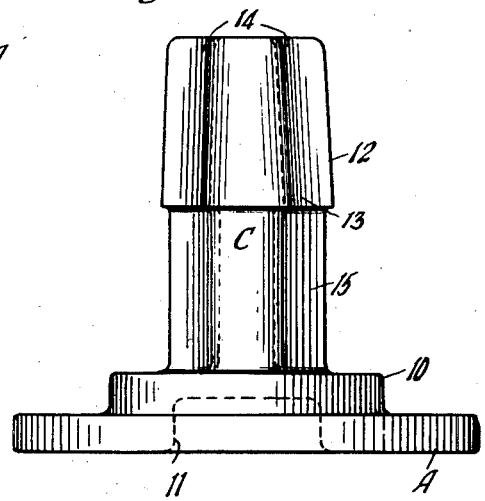

2,411,279

UNITED STATES PATENT OFFICE 2,411,279

FRICTION SHOCK ABSORBER

Edward H. Lehman, Chicago, Ill., assignor to W. H. Miner, Inc., Chicago, Ill., a corporation of Delaware Application January 31, 1944, Serial No. 520,466

6 Claims. (Cl. 267—9)

This invention relates to improvements in friction shock absorbers, especially adapted for snubbing or dampening the action of railway car truck springs.

One object of the invention is to provide a friction shock absorber including a tapered friction post and relatively movable spring friction members, slidably engaging the post, wherein the spring friction members are in the form of resilient bars embracing the post.

A more specific object of the invention is to provide a friction shock absorber, comprising end followers; a tapered friction post projecting from one of said followers; a plurality of spring bars fixed to the other follower and surrounding the post and having lengthwise sliding engagement therewith; and a spring surrounding said post and bars and bearing at opposite ends on said followers to yieldingly resist relative longitudinal movement of the post and friction bars.

Other objects of the invention will more clearly appear from the description and claims hereinafter following.

In the drawing forming a part of this specification, Figure 1 is a transverse, vertical, sectional view of my improved shock absorber, on two radial planes at an angle of 120° to each other, corresponding substantially to the line 1—1 of Figure 2, the friction bars being shown in elevation. Figure 2 is a transverse, horizontal, sectional view, corresponding substantially to the line 2—2 of Figure 1. Figure 3 is a top plan view of the improved shock absorber. Figure 4 is an elevational view of the friction post.

My improved shock absorber comprises broadly a pair of end followers A and B; a friction post C formed integral with one of said followers; three friction spring bars D—D—D fixed to the other follower; and a spring E.

The follower A is in the form of a heavy disc-like plate having an upwardly extending, central, cylindrical enlargement or boss 10. The follower A has a downwardly opening, central seat 11, adapted to accommodate the usual spring centering projection of the lower spring plate of the truck spring cluster of a railway car.

The friction post C is formed integral with the follower A and projects upwardly from the boss 10 and has its vertical axis coincident with the central vertical axis of the mechanism. The upper end of the post is slightly enlarged and presents a head portion 12. The head portion 12 is upwardly tapered and has three longitudinally extending, exterior grooves 13—13—13, which are inclined toward the center of the mechanism, and are spaced symmetrically about the central vertical axis of said post. The grooves are transversely curved and present three concave, longitudinally extending, friction surfaces 14—14—14, which converge toward the upper end of the post. Below the head 12 of the post, the latter is provided with three grooves 15—15—15, which are in alignment with the grooves 13—13—13, but of greater depth.

The follower B is in the form of a heavy disc-like plate having a centrally disposed, depending, solid, cylindrical boss 16 thereon. The follower B is also provided with a centrally disposed, upwardly opening seat 17 adapted to receive the usual spring centering projection of the upper spring plate of a truck spring cluster.

The boss 16 of the follower B is further provided with three vertically extending, cylindrical openings 18—18—18, which are spaced symmetrically about the central vertical axis of the mechanism. As clearly shown in Figures 1 and 3, the openings 18 also extend through the disc portion of this follower.

The friction bars D, which are three in number, are of spring steel and form the spring friction members of the device. These bars are of truly circular, transverse cross section and slidingly fit the transversely curved friction surfaces 14—14—14 of the post C. The three bars D—D—D depend from the follower B having their upper ends fixed in the openings 18—18—18, as clearly shown in Figure 1. To secure the bars in place, they are preferably welded to the follower B, as indicated at 19. In the assembled condition of the mechanism, the lower end portions of these bars, which embrace the post C on three sides, are flexed outwardly or spread apart, as shown in Figure 1, said lower end portions being inclined to correspond with the inclination of the friction surfaces of the post and contact with said friction surfaces substantially throughout the length of the latter.

The spring E comprises a relatively heavy coil surrounding the post C and the spring friction bars D—D—D and bearing at its top and bottom ends on the followers B and A, respectively. The spring E is preferably so proportioned that it is under initial compression when the shock absorber is in assembled condition between the top and bottom spring follower plates of the truck spring cluster of a railway car.

My improved friction shock absorber preferably replaces one of the spring units of a truck spring cluster of a railway car, being interposed between the top and bottom spring follower plates of said cluster. However, more than one of said shock absorbers may be employed with a spring cluster, the same being substituted for two or more of the spring units of the same.

The operation of my improved shock absorber is as follows: Upon the spring cluster of the truck of a railway car being compressed between the spring follower plates of said cluster, the followers A and B are moved relatively toward each other against the resistance of the spring E, carrying the friction post C and spring friction bars therewith, and effecting relative lengthwise movement thereof with resultant friction therebetween. Due to the taper of the post, the friction spring bars are spread apart as the compression of the mechanism progresses, the same being flexed outwardly, and, due to their inherent resiliency, progressively increasing the pressure on the post and the frictional resistance produced. The action of the truck springs is thus effectively snubbed or dampened. Upon recoil of the truck springs, the spring follower plates of the cluster are separated and the spring E is free to expand, returning all of the parts to the normal position shown in Figure 1.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction post having longitudinally extending, transversely curved friction surfaces; of a plurality of cylindrical, inherently resilient friction bars surrounding said post, and having lengthwise sliding engagement with the friction surfaces thereof, said bars being rigidly supported against spreading action at their outer ends and having the inner ends thereof embracing the post; and spring means yieldingly opposing relative lengthwise movement of said post and bars toward each other.

2. In a friction shock absorber, the combination with a tapered friction post having lengthwise extending, transversely curved friction surfaces; of a follower provided with a plurality of openings therethrough; a plurality of inherently resilient, round bars surrounding said post, said bars having their outer ends rigidly fixed in said openings of the follower against relative spreading apart, and having their inner end portions embracing said post in lengthwise sliding engagement with the friction surfaces thereof; and a spring surrounding said post and bars and yieldingly opposing relative movement of said follower and post, toward each other lengthwise of the mechanism.

3. In a friction shock absorber, the combination with a tapered friction post; of three friction spring bars, symmetrically spaced about the axis of the mechanism and surrounding said post, and having lengthwise sliding engagement therewith, said bars being rigidly supported against spreading action at their outer ends and having the inner ends thereof embracing the post; and spring means yieldingly opposing relative lengthwise movement of said post and bars toward each other.

4. In a friction shock absorber, the combination with a tapered friction post; of a follower; three friction spring bars surrounding said post, having their outer ends rigidly fixed to said follower against spreading action, and having their inner end portions embracing said post in lengthwise sliding engagement therewith; and spring means yieldingly opposing relative lengthwise movement of said post and bars toward each other.

5. In a friction shock absorber, the combination with a pair of end followers relatively movable toward and away from each other, lengthwise of the mechanism; of a tapered friction post projecting inwardly from one of said followers; three friction spring bars fixed to the other follower and projecting toward said post, said bars surrounding said post and having their inner end portions embracing said post in lengthwise sliding engagement therewith, said bars being spaced symmetrically about the central longitudinal axis of the mechanism; and a spring surrounding said post and bars and having its opposite ends bearing on said end followers, respectively.

6. In a friction shock absorber, the combination with a pair of end followers relatively movable toward and away from each other, lengthwise of the mechanism; of a friction post projecting inwardly from one of said followers, said post having three concave, exterior, longitudinally extending, friction grooves symmetrically spaced about the longitudinal central axis of the mechanism, said grooves extending to the outer end of the post and converging inwardly toward said axis; three cylindrical friction spring bars spaced symmetrically about said axis, said bars being fixed at one end to the other follower, projecting toward said post, and having sliding engagement respectively within the friction grooves of said post; and a spring surrounding said post and bars and having its opposite ends bearing on said end followers, respectively.

EDWARD H. LEHMAN.